United States Patent [19]

Lindeke

[11] Patent Number: 5,237,894
[45] Date of Patent: Aug. 24, 1993

[54] MATERIAL MACHINING WITH IMPROVED FLUID JET ASSISTANCE

[75] Inventor: Richard R. Lindeke, Duluth, Minn.

[73] Assignee: Cleveland State University, Cleveland, Ohio

[21] Appl. No.: 913,931

[22] Filed: Jul. 17, 1992

Related U.S. Application Data

[63] Continuation-in-part of Ser. No. 781,159, Oct. 22, 1991, abandoned.

[51] Int. Cl.⁵ .................... B23B 1/00; B23B 27/10
[52] U.S. Cl. ........................... 82/1.11; 82/900; 407/11
[58] Field of Search .............. 82/1.11, 50, 173, 900, 82/901; 407/11

[56] References Cited

U.S. PATENT DOCUMENTS

| | | | |
|---|---|---|---|
| 160,161 | 2/1875 | Clay | 407/11 |
| 3,889,520 | 6/1975 | Stoferle et al. | 407/11 |
| 3,971,114 | 7/1976 | Dudley | 82/173 |
| 4,621,547 | 11/1986 | Yankott | 82/1.11 |
| 4,791,840 | 12/1988 | De Rosier et al. | 82/1.11 |
| 4,829,859 | 5/1989 | Yankott | 82/1.11 |
| 5,148,728 | 9/1992 | Mazurkiewicz | 82/1.11 |

FOREIGN PATENT DOCUMENTS 3740814 6/1989 Fed. Rep. of Germany .
2224590 4/1975 France .

Primary Examiner—Z. R. Bilinsky
Attorney, Agent, or Firm—John F. McDevitt

[57] ABSTRACT

Improved machining of various materials is disclosed by means of a material cutting insert having an internal fluid passageway which discharges a high velocity fluid jet stream in a particular manner. An improved method for use of the cutting insert is also disclosed along with apparatus employing the improvement.

4 Claims, 2 Drawing Sheets

MATERIAL MACHINING WITH IMPROVED FLUID JET ASSISTANCE

This is a continuation in part of application Ser. No. 07/781,159, filed Oct, 22, 1991 and now abandoned.

BACKGROUND OF THE INVENTION

This invention relates generally to improved means for machining various solid materials with assistance of a high velocity fluid jet stream including the method therefor, and more particularly to a modified cutting insert which enables improved cutting action.

Material cutting operations such as turning, milling, boring, shaping and grooving conventionally employ working fluids for cooling and lubrication. These fluids are generally liquids such as water and other liquid dispersions which are dispensed in various ways at the tool interface with material being removed when a particular cutting operation is being carried out. High velocity jet streams are now being utilized to improve the lubrication and cooling mechanisms involved for reduced machining costs and extended tool life particularly with respect to metal machining which typically utilizes various type metal cutting inserts. For example, there is disclosed in U.S. Pat. No. 4,621,547 a method and means being employed with a turning lathe which includes a metal cutting insert provided with external coolant delivery means to discharge a high velocity jet of the coolant which flows across the top surface of the insert toward the cutting edge-workpiece interface. As therein described, the high velocity jet of coolant is ejected between the top surface of the cutting insert and underside of the chip from a discharge orifice in the tool holder. The coolant flows through an internal passageway provided in the tool holder by a delivery line connected at one end to the clamping member of the tool holder and at the other end to a pump with rating of about 1000-3000 PSI. The coolant is conveyed within the clamping member by a connector passageway connected at one end with the delivery line and communicating with the entrance opening of such internal transition passageway. Tool feed rate, orifice distance and coolant velocity are further reported to be critical in obtaining improved chip control and tool life with the disclosed apparatus. Similar apparatus means for machining a metal workpiece are also disclosed in U.S. Pat. No. 4,695,208 wherein the tool holder generally comprises a support bar formed with a cavity which is adapted to receive a shim in the form of flat plate or support block formed with a seat. An insert having a top surface terminating with a cutting edge is mounted atop the shim or within the seat in the support block so that the top surface of the insert is exposed and the cutting edge extends outwardly from the holder. Again, coolant delivery means physically separate from the cutting insert are provided in the tool holder which delivers a high velocity coolant jet across the exposed top surface of the insert toward its cutting edge and beneath the underside of chips formed from a workpiece. Such manner of coolant delivery is reported to achieve improved chip breakage and increased tool life but is further said to require structural means to guide the chip into substantial alignment with the cooling jet in order to do so.

Jet cooling assistance for metal machining at higher delivery pressures is also disclosed in a technical article entitled "Metal Machining with High Pressure Water—Jet Cooling Assistance—A New Possibility" authored by M. Mazurkiewicz, Z. Kubala and J. Chow, Journal of Engineering for Industry, Volume 111/7 (February 1989). As disclosed therein, external jet orifice means provide the coolant jet which is directed at the intersection between the cutting edge of a metal cutting insert and the metal chip being formed utilizing an otherwise conventional turning lathe apparatus. The physically separate and distinct jet orifice means being utilized therein is reported to feature nozzle diameters in the range 0.135-0.35 millimeters with fluid velocities being reported to reside in the range from 370-740 meters per second. The pressurized water being delivered to the cutting area by such means is said to be supplied with high pressure tubing connected to the jet nozzle. At the defined metal cutting conditions, significant improvement is reported for both material removal rate and desired short chip formation even with poorly machinable metals.

It is one object of the present invention to provide still more effective means to conduct fluid jet assisted machining of various solid materials.

Another important object of the present invention is to provide a novel method for conducting fluid jet assisted machining of various solid materials.

Still a further object of the invention is to provide a novel metal cutting insert enabling discharge of a high velocity fluid stream therefrom in an improved manner.

Another object of the invention is to provide a novel tool holder for improved jet assisted machining of a metal workpiece.

These and still further objects of the present invention will become apparent upon considering the following detailed description of the present invention.

SUMMARY OF THE INVENTION

Simpler and still more effective means have now been discovered for utilization of high velocity fluid jet assistance when conducting cutting operations on various solid materials. More particularly, such improvement includes providing a cutting insert which itself includes an internal fluid passageway from which the high velocity fluid jet stream is discharged in a manner better directed toward the material being removed. Pressurized fluid is conveyed to the improved cutting insert with an internal passageway provided in the tool holder which still further includes jet orifice means physically secured thereto. As herein contemplated, the novel tool holder comprises (a) a support bar having one end formed with a seating cavity in which the material cutting insert is mounted so as to have its cutting edge exposed, said cutting insert further including an internal fluid passageway sloping toward the cutting edge and discharging a high velocity fluid jet stream at its top surface which is better directed toward the material being removed, (b) the support bar further including an internal fluid passageway connected at an entrance opening to jet orifice means while being in communication at a discharge opening with the internal passageway of said cutting insert, and (c) fluid delivery means connected to the jet orifice means which delivers high pressure fluid thereto. In a preferred embodiment adapted for machining a metal workpiece, the tool holder employs a metal cutting insert configured with opposing flat top and bottom surfaces joined together with a linear cutting side edge being further integrally joined together with (a) a support bar having one end formed with a seating cavity in which the metal cutting insert is mounted so as to have its cutting edge exposed, said cutting insert further including an internal fluid passageway sloping toward said cutting edge, and located intermediate the ends of said cutting edge to discharge a high velocity jet stream perpendicular to said cutting edge at the top surface, (b) an intermediate metal shim physically supporting the cutting insert within the seating cavity and having an open-ended fluid passageway connected at one end to the internal passageway of said cutting insert, (c) the support bar further including an internal fluid passageway connected at an entrance opening to jet orifice means while being connected at a discharge opening to the other open end of the internal fluid passageway located in the intermediate metal shim, and (d) fluid pumping means connected to the jet orifice means for delivery of the high pressure fluid thereto. Better aiming of the fluid jet stream directly at the chip being formed results in the foregoing manner rather than having the jet stream aimed at the rake face of the metal cutting insert which has been found to not only improve cooling and lubrication but further avoids damaging the metal insert particularly with respect to employment of cemented carbide inserts.

Operation of the above described type apparatus embodiments further proceeds in a novel manner. More particularly, said general method comprises (a) machining the workpiece with a cutting insert having a top tool surface terminating in a cutting edge which further includes an internal fluid passageway sloping toward said cutting edge, (b) engaging the workpiece with said cutting insert while discharging a high velocity fluid jet stream at its top surface from the fluid passageway which is directed at the material being removed, and (c) advancing the cutting insert with respect to the workpiece so that the path of the discharge high velocity fluid jet stream remains in a predetermined direction relative to the feed direction of the cutting insert. The path of the discharged high velocity fluid jet stream can either lie in a direction substantially parallel to the feed direction of the cutting insert or lie in a direction forming an acute angle with the feed direction of the cutting insert. As herein contemplated with respect to customary lathe turning operations, such improved method can further utilize the same fluid pressure conditions, feed rates and cutting speeds as reported in the above referenced technical article relating to metal machining with jet cooling assistance.

Various physical configurations for a suitable material cutting insert to enable the above defined improvement are also contemplated. For example, a metal cutting insert having a triangular configuration formed by intersecting side edges and a rear side edge can be modified in accordance with the present invention to be used in various metal turning operations. Such insert is further generally configured with opposing flat top and bottom surfaces joined together with a linear cutting side edge. Cutting inserts having a generally rectangular shape are also contemplated along with having various rake angles and rake face topographies being provided relative to the cutting edge. Understandably, a suitable cutting insert according to the present invention can also be formed with a wide variety of already known metals and non-metals to include alloy steels, tungsten carbide and even ceramic materials.

DETAILED DESCRIPTION OF THE PREFERRED EMBODIMENTS

Figure 1:
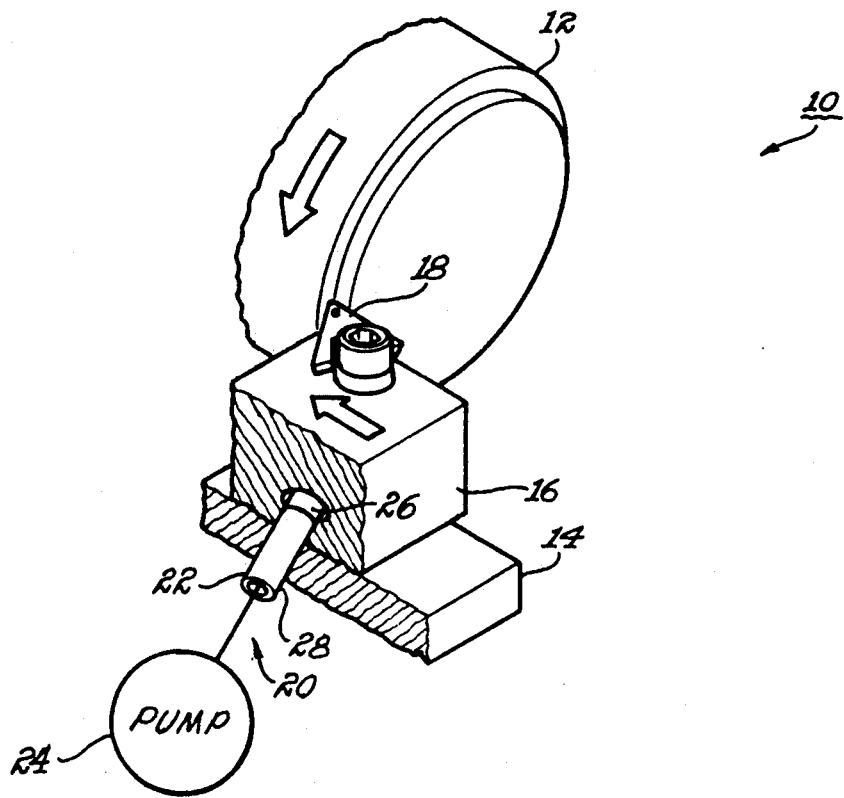
FIG 1 is a perspective view partially depicted in cross section for a typical metal cutting operation according to the present invention.

Referring to the drawings, FIG. 1 depicts a metal workpiece of cylindrical rod form being machined on a lathe apparatus 10 according to the present invention. Specifically, said workpiece 12 is mounted in the jaws of a conventional rotating chuck member (not shown) to conduct a turning operation whereby metal is removed with the depicted tool post construction. Tool holder means 14 employs a support tool holder bar 16 in which a metal cutting insert 18 is mounted and which has been further coupled to fluid delivery means 20 in order to supply a high pressure fluid jet stream (not shown) aimed directly at the site of chip formation as the metal cutting operation takes place. The internal passageway construction of the depicted tool holder means 14 enabling such result to be carried out is more fully explained in FIG. 2. Said tool holder means 14 is mounted by conventional means on the customary feed carriage (not shown) for said lathe apparatus 10 with the feed direction also being indicated in the present drawing by an arrow. The fluid delivery means 20 includes jet orifice means 22 supplying conventional liquid coolant to support bar member 16 with a high pressure pump 24. A nozzle 26 is physically secured to said support bar member for this purpose which is further operatively associated with commercially available pneumatic control valve means 28 to supply such liquid coolant at the higher delivery pressure conditions pointed out in the previously referenced technical publication. Accordingly, jet nozzle diameters in the approximate range 0.134–0.030 millimeters prove satisfactory at coolant velocities in the approximate range 370–740 meters per second when employed with a cylindrical passageway diameter in the depicted tool holder and metal insert embodiment of approximately 1.27 millimeters. When operated in such manner with the specified jet orifice means delivering high pressure coolant at discharge pressures in the approximate range 70–280 MPa, the depicted tool holder means 14 is advanced continuously in the direction shown while discharging coolant in a predetermined direction relative to said feed direction.

Figure 2:
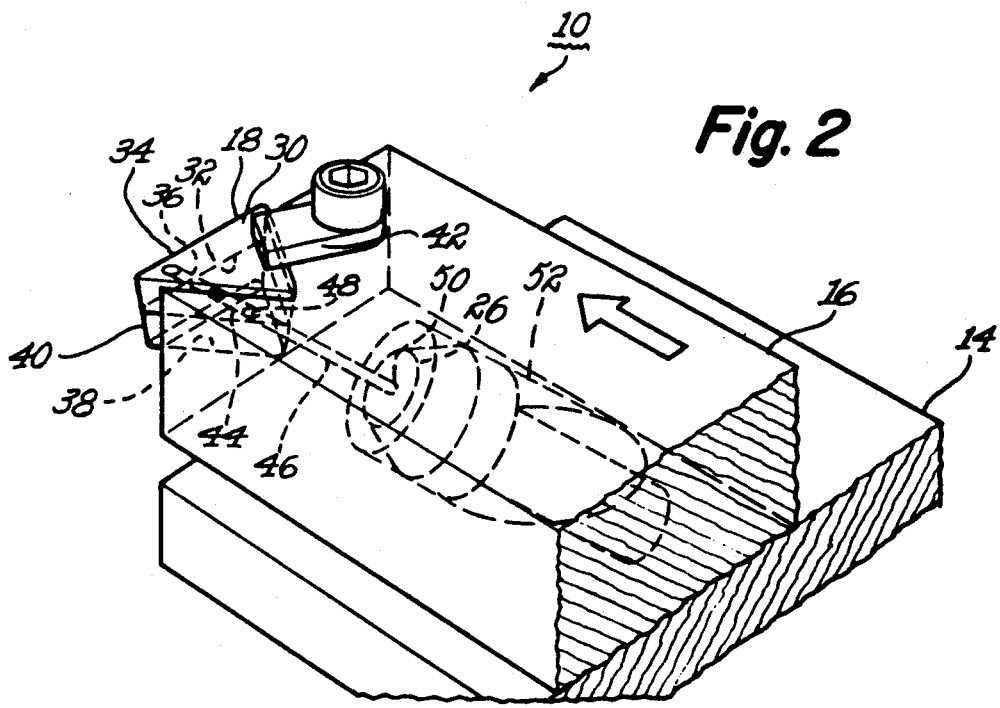
FIG. 2 is a perspective side view depicting the tool holder employed in the FIG. 1 embodiment.

The tool holder means 14 being employed in the FIG. 1 apparatus embodiment is further illustrated in the FIG. 2 drawing. Accordingly, the same numerals are retained in FIG. 2 to identify common features in said tool holder means. As can be seen in the present drawing, said tool holder means includes support bar member 16 in which is physically secured a triangular shaped metal cutting insert 18. Depicted cutting insert 18 can further to be seen to have flat top and bottom surfaces 30 and 32, respectively, which are joined together by a linear side cutting edge 34. Said cutting insert is further provided with a forward sloping internal passageway 36 from which the high velocity coolant stream is discharged at top surface 30 in a direction substantially perpendicular to side cutting edge 34. To properly aim the emerging coolant stream directly at the metal chip being formed with cutting edge 34, the insert is mounted in a hollow seating cavity 38 provided in the support bar member so as to have its cutting edge exposed. A metal shim 40 physically supports the cutting insert in said hollow cavity 38 with both shim and insert members further being secured in place thereat by conventional clamp means 42. As can further be seen in the present drawing, the internal passageway 36 provided in metal cutting insert 18 communicates with still other internal passageways 44 and 46 included in the presently illustrated tool holder embodiment for delivery of coolant thereto. Internal passageway 44 in the shim member 40 is connected at one end to the internal passageway of said cutting insert while being connected at the opposite end to a discharge opening 48 as provided in the internal passageway 46 also formed in support bar member 16. Jet nozzle 26 can be secured in place at the entrance opening 50 of internal passageway 46 without need for any added seal means customarily now being included with conventional jet assisted cooling operation. A further seating cavity 52 is provided in support bar member 16 to retain said jet nozzle in place with conventional clamp means (not shown) enabling the desired physical interconnection therebetween. From a further reference in the present drawing to the feed direction of the tool holder unit being depicted, it can be noted that the direction of the fluid jet stream emerging from the assembled unit will reside at an acute angle with respect to said feed direction.

A uniquely improved cutting action takes place according to the present invention. Such improvement is attributable to a far greater participation of the emerging coolant stream in the cutting action as a result of properly aiming the coolant with respect to the exact workpiece location where chips are being formed with the present apparatus. In doing so, the coolant is required to be ejected from the jet nozzle at discharge pressures in the approximate range 70-280 MPa and a coolant velocity rate in the approximate range 370-740 meters/sec. Heretofore, such elevated operating conditions for the liquid coolant were not utilized to any significant degree since extreme difficulty was experienced in maintaining a reliable physical seal between the jet orifice means and the associated cutting insert. This problem is minimized in the present apparatus by having larger size openings in the associated cutting insert than employed in the jet nozzle directly connected thereto for delivery of the liquid coolant. As a result, liquid coolant being discharged at the present operating conditions from a previously indicated 0.134-0.030 millimeter jet nozzle diameter into cylindrical passageways of the associated cutting insert having diameters also previously indicated to be approximately 1.27 millimeters causes the emerging coolant to undergo a significant pressure to velocity conversion. The lowering of fluid pressure by such means in the present apparatus largely avoids the previously experienced seal failures.

Figure 3:
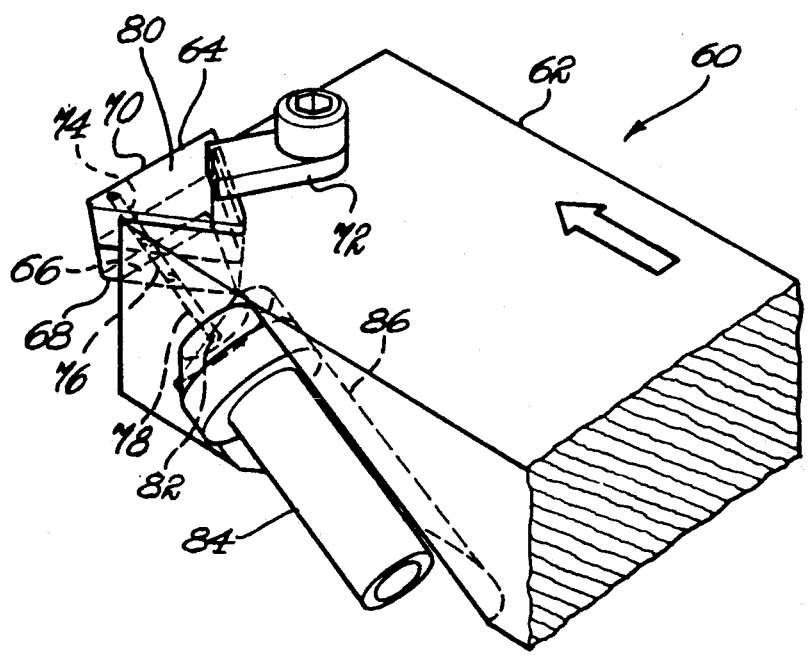
FIG. 3 is a perspective view depicting another tool holder means according to the present invention.

In FIG. 3 there is depicted an alternative tool holder embodiment in accordance with the present invention. More particularly, tool holder means 60 includes support bar member 62 in which is physically secured a triangular shaped metal cutting insert 64 having a physical configuration substantially the same as that described in the preceding embodiment. Said cutting insert 64 is again mounted in a seating cavity 66 provided in the support bar member which further retains a metal shim 68 physically supporting the cutting insert. The linear cutting edge 70 of said cutting insert is also again exposed with both cutting insert and shim members similarly being secured in the seating cavity of support bar member 62 with conventional clamp means 72. Likewise, the metal cutting insert 64 includes a forward sloping internal passageway 74 which is further connected to other internal passageways 76 and 78 provided in the depicted shim and support bar members, respectively, so that a fluid jet stream can be directed at top surface 80 of said cutting insert in the proper direction. An entrance opening 82 provided to internal passageway 78 also again physically interfaces with jet nozzle 84 which is secured in a second seating cavity 86 of the support bar member. As distinct from the preceding embodiment, however, it can be noted from a further reference to the present drawing that the travel direction of the fluid jet stream now being provided lies substantially parallel to the feed direction of the cutting insert. On the other hand, proper aiming of said fluid jet stream so as to intersect with the metal chip being formed during a machining operation is preserved by still having its direction reside substantially perpendicular to the insert cutting edge.

It will be apparent from the foregoing description that a broadly useful and novel means has been provided to machine various solid materials with assistance of a high velocity fluid jet stream in a significantly improved manner. It is contemplated that modifications can be made in the specific apparatus means and method for obtaining said improvement than herein illustrated, however, without departing from the true spirit and scope of the present invention. For example, a similar modification to machining apparatus other than a turning lathe which incorporates the presently disclosed means is contemplated as well as making such modification to various other already known tool holders. Likewise, it is contemplated that materials other than metals can be machined with the presently improved means such as poorly machinable and thermally sensitive materials like ceramics. Consequently, it is intended to limit the present invention only by the scope of the following claims.

What I claim as new and desire to secure by Letters Patent of the United States is:

1. A method of machining a workpiece with a tool holder which includes an improved material cutting insert having a top surface terminating in a cutting edge, said tool holder comprising a support bar having one end formed with a seating cavity in which the cutting insert is mounted so as to have its cutting edge exposed, said cutting insert, further including a first internal fluid passageway sloping toward said cutting edge and discharging a high velocity fluid jet stream at said top surface which is directed toward the material being removed when the cutting operation is conducted, the support bar further including a second internal fluid passageway connected at an entrance opening to jet orifice means while being in communication at a discharge opening with the internal passageway of said cutting insert, both internal passageways being provided with larger size openings than provided in the jet orifice means, and fluid delivery means connected to the jet orifice means which delivers high pressure liquid coolant thereto at discharge pressures in the approximate range 70-280 MPa at a coolant velocity rate in the approximate range 370-740 m/sec. comprising the steps of:

(a) rotating the workpiece,
(b) engaging the material with said cutting insert while discharging the liquid coolant at its top surface from the first fluid passageway which is directed at the material being removed, and
(c) advancing the cutting insert with respect to the workpiece so that the path of the discharged coolant remains in a predetermined direction relative to the feed direction of the cutting insert.

2. The method of claim 1 wherein the path of the discharged high velocity fluid jet stream lies in a direction substantially parallel to the feed direction of the cutting insert.

3. The method of claim 1 wherein the path of the discharged high velocity fluid jet stream lies in a direction forming an acute angle with the feed direction of the cutting insert.

4. The method of claim 1 wherein the cutting insert is provided with a linear cutting edge and the high velocity fluid jet stream is discharged intermediate the ends of said linear cutting edge in a direction substantially perpendicular thereto.

* * * * *